(12) United States Patent
Prins et al.

(10) Patent No.: US 11,908,129 B2
(45) Date of Patent: Feb. 20, 2024

(54) IMPAIRMENT ANALYSIS SYSTEMS AND RELATED METHODS

(71) Applicant: iAlyze, LLC, Chapel Hill, NC (US)

(72) Inventors: Willem Prins, Chapel Hill, NC (US); Alexander Adam Papp, Raleigh, NC (US); Matthew E. Czajkowski, Chapel Hill, NC (US)

(73) Assignee: iAlyze, LLC, Chapel Hill, NC (US)

(*) Notice: Subject to any disclaimer, the term of this patent is extended or adjusted under 35 U.S.C. 154(b) by 0 days.

(21) Appl. No.: 17/132,319

(22) Filed: Dec. 23, 2020

(65) Prior Publication Data

US 2021/0200991 A1 Jul. 1, 2021

Related U.S. Application Data

(60) Provisional application No. 62/954,094, filed on Dec. 27, 2019.

(51) Int. Cl.

| | |
|---|---|
| *G06T 7/00* | (2017.01) |
| *G01P 13/00* | (2006.01) |
| *G01S 15/08* | (2006.01) |
| *G06T 7/20* | (2017.01) |
| *G06V 40/16* | (2022.01) |
| *G06V 10/141* | (2022.01) |
| *G06V 40/19* | (2022.01) |
| *H04N 23/56* | (2023.01) |
| *G06V 10/764* | (2022.01) |

(52) U.S. Cl.
CPC ............ *G06T 7/0012* (2013.01); *G01P 13/00* (2013.01); *G01S 15/08* (2013.01); *G06T 7/20* (2013.01); *G06V 10/141* (2022.01); *G06V 10/764* (2022.01); *G06V 40/166* (2022.01); *G06V 40/19* (2022.01); *H04N 23/56* (2023.01); *G06T 2207/10048* (2013.01); *G06T 2207/30201* (2013.01)

(58) Field of Classification Search
None
See application file for complete search history.

(56) References Cited

U.S. PATENT DOCUMENTS

| | | |
|---|---|---|
| 7,614,745 B2 | 11/2009 | Waldorf et al. |
| 8,226,574 B2 | 7/2012 | Whillock et al. |

(Continued)

*Primary Examiner* — James M Anderson, II
(74) *Attorney, Agent, or Firm* — Olive Law Group, PLLC

(57) ABSTRACT

Impairment analysis systems and related methods are disclosed. According to an aspect, an impairment analysis system includes a light source configured for directing light towards a subject. Further, the system includes a distance sensor configured for determining a location of the subject. The system also includes an image capture device configured for capturing one or more images of the subject. Further, the system includes a computing device configured to control the light source to emit light in a predetermined pattern to apply light stimulus to the subject. The computing device is also configured to receive, from the distance sensor, information regarding the determined location of the subject. Further, the computing device is configured to receive, from the image capture device, the captured one or more images of the subject including one of a facial movement and position of the subject while the light stimulus is applied to the subject.

31 Claims, 7 Drawing Sheets

(56) References Cited

U.S. PATENT DOCUMENTS

| | | | |
|---|---|---|---|
| 8,899,748 B1* | 12/2014 | Migdal | A61B 5/004 |
| | | | 351/210 |
| 9,004,687 B2 | 4/2015 | Stack | |
| 9,357,966 B1 | 6/2016 | Cohen | |
| 10,016,130 B2* | 7/2018 | Ganesan | G02B 27/017 |
| 10,037,676 B1 | 7/2018 | Scharf et al. | |
| 2015/0245766 A1* | 9/2015 | Rennaker | A61B 3/14 |
| | | | 351/210 |
| 2017/0372633 A1 | 12/2017 | Zielke et al. | |
| 2019/0087973 A1 | 3/2019 | Kaehler et al. | |
| 2020/0387284 A1* | 12/2020 | Shi | G01S 15/46 |
| 2020/0397288 A1* | 12/2020 | Zidan | A61B 5/163 |
| 2021/0275015 A1* | 9/2021 | Yellin | A61B 5/4863 |

\* cited by examiner

IMPAIRMENT ANALYSIS SYSTEMS AND RELATED METHODS

CROSS REFERENCE TO RELATED APPLICATION

This application claims priority to U.S. Provisional Patent Application No. 62/954,094, filed Dec. 27, 2019, and titled IMPAIRMENT ANALYSIS SYSTEMS AND RELATED METHODS, the content of which is incorporated herein by reference in its entirety.

TECHNICAL FIELD

The presently disclosed subject matter relates generally to impairment analysis systems and related methods.

BACKGROUND

Systems have been developed for determining whether a subject is impaired. For example, such systems can determine whether the subject is impaired due to alcohol or drug use, sleep deprivation, or a medical condition. Systems can determine alcohol or drug induced impairment by tracking and analyzing eye movement of the subject. Particularly, for example, it has been demonstrated scientifically that there is a correlation between a blood alcohol concentration (BAC) greater than a certain value (e.g., a BAC greater than 0.08) and the presentation of horizontal gaze nystagmus (HGN) in a subject. Also, vertical gaze nystagmus (VGN) can be an effective indicator of alcohol impairment.

There is a desire to provide improved systems and techniques for determining whether a subject is impaired.

BRIEF DESCRIPTION OF THE DRAWINGS

Figure 1:
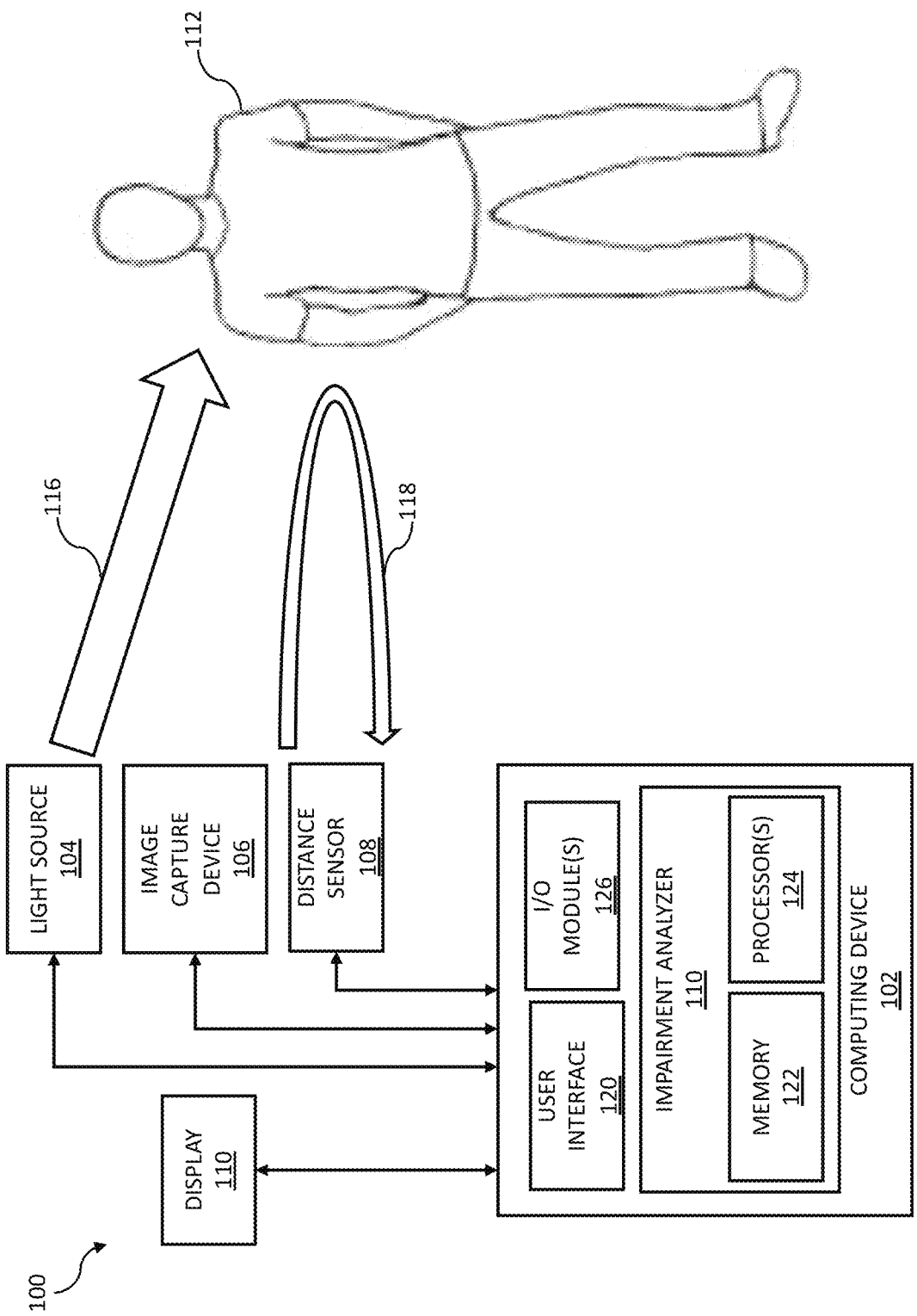
Figure 2:
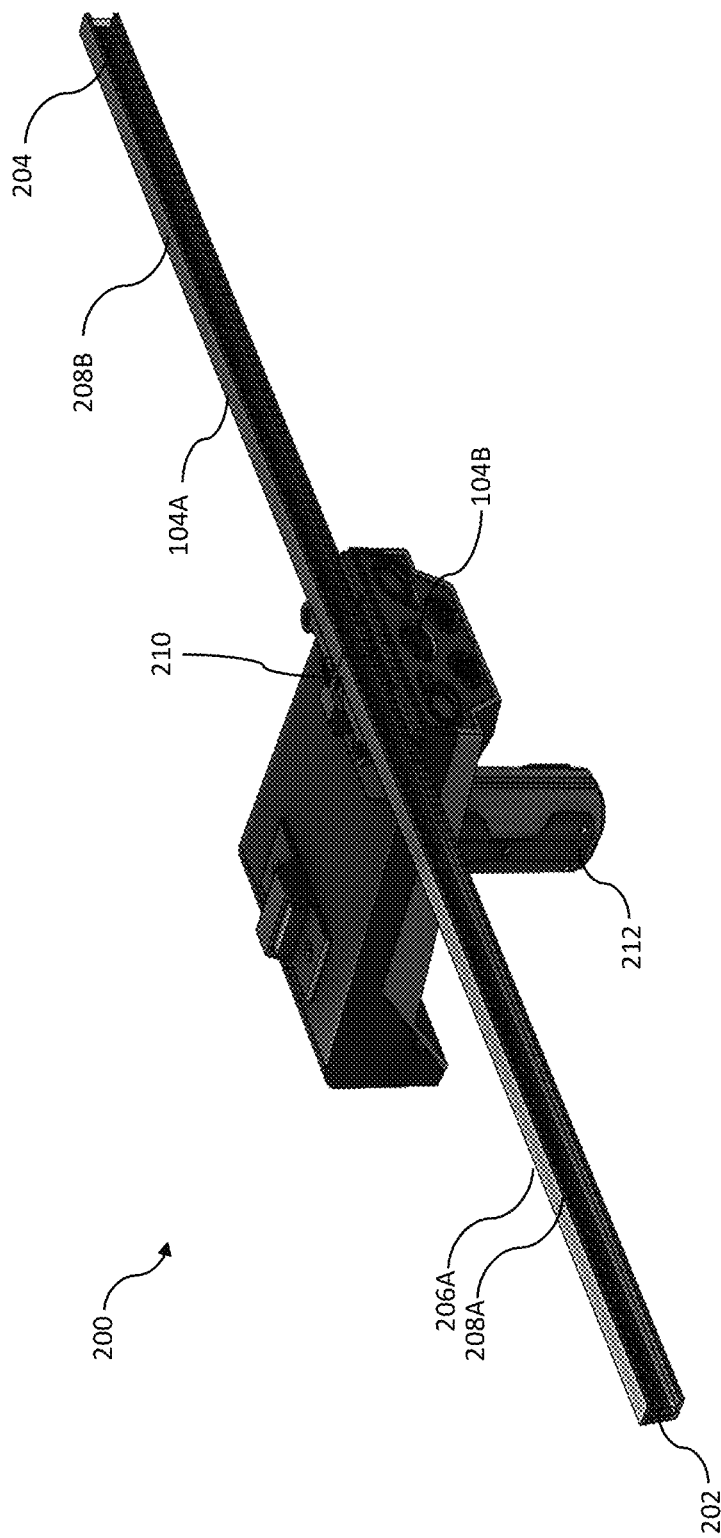
Figure 3:
Figure 4:
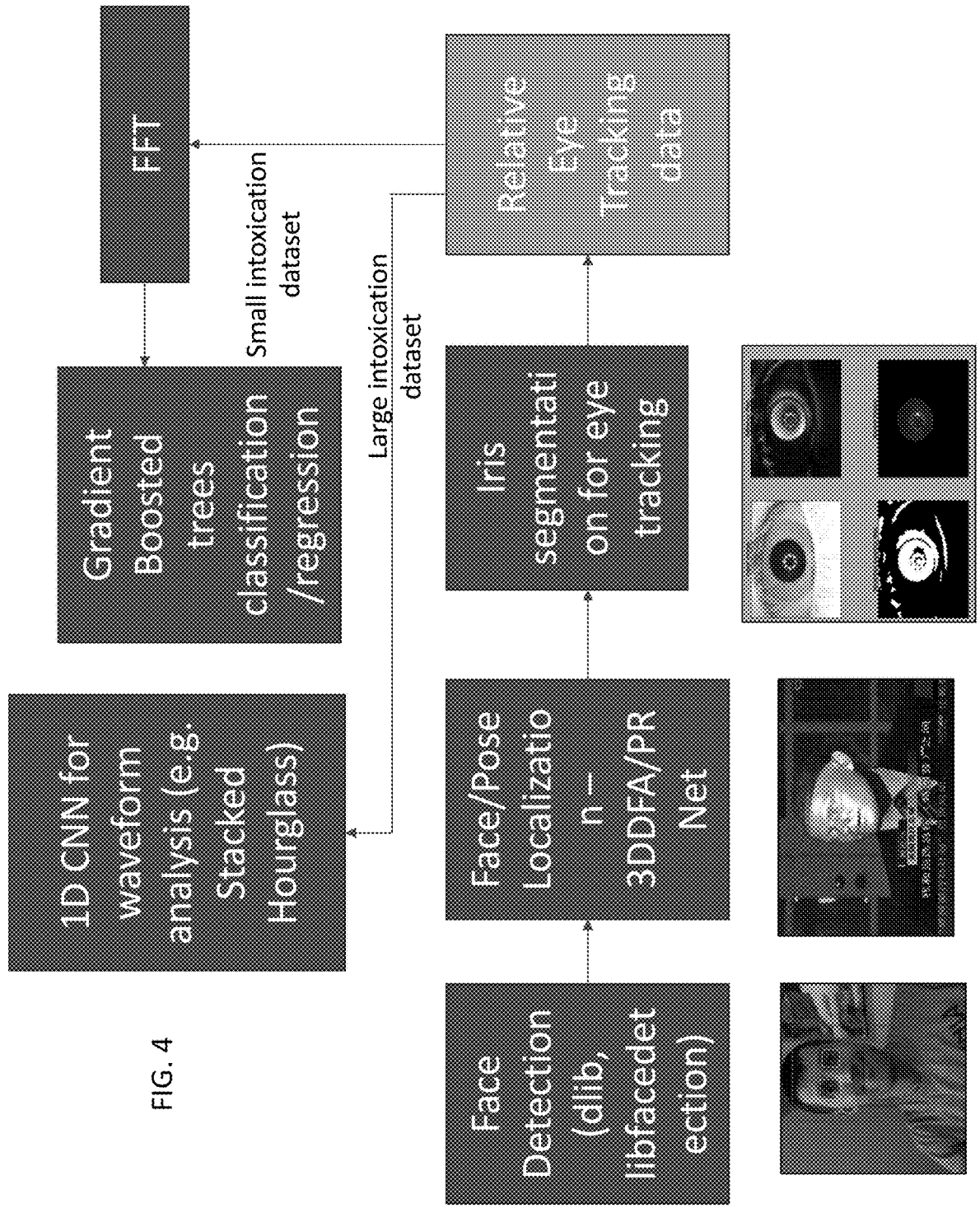
Figure 5:
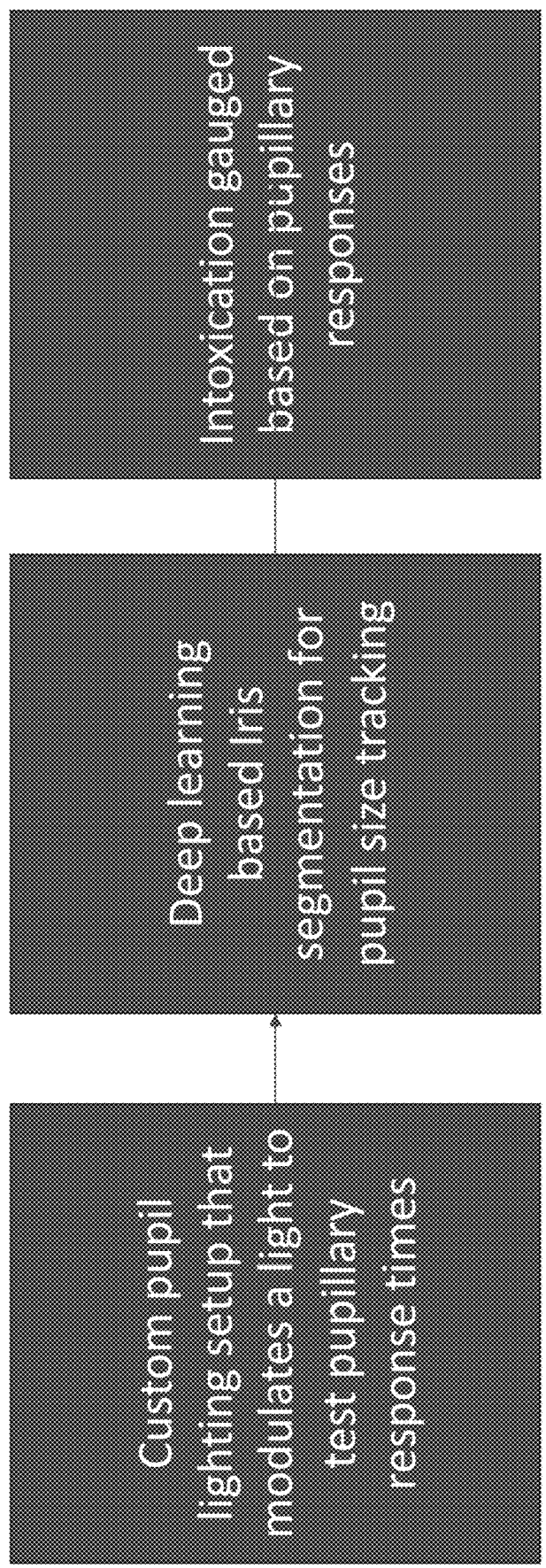
Figure 6:
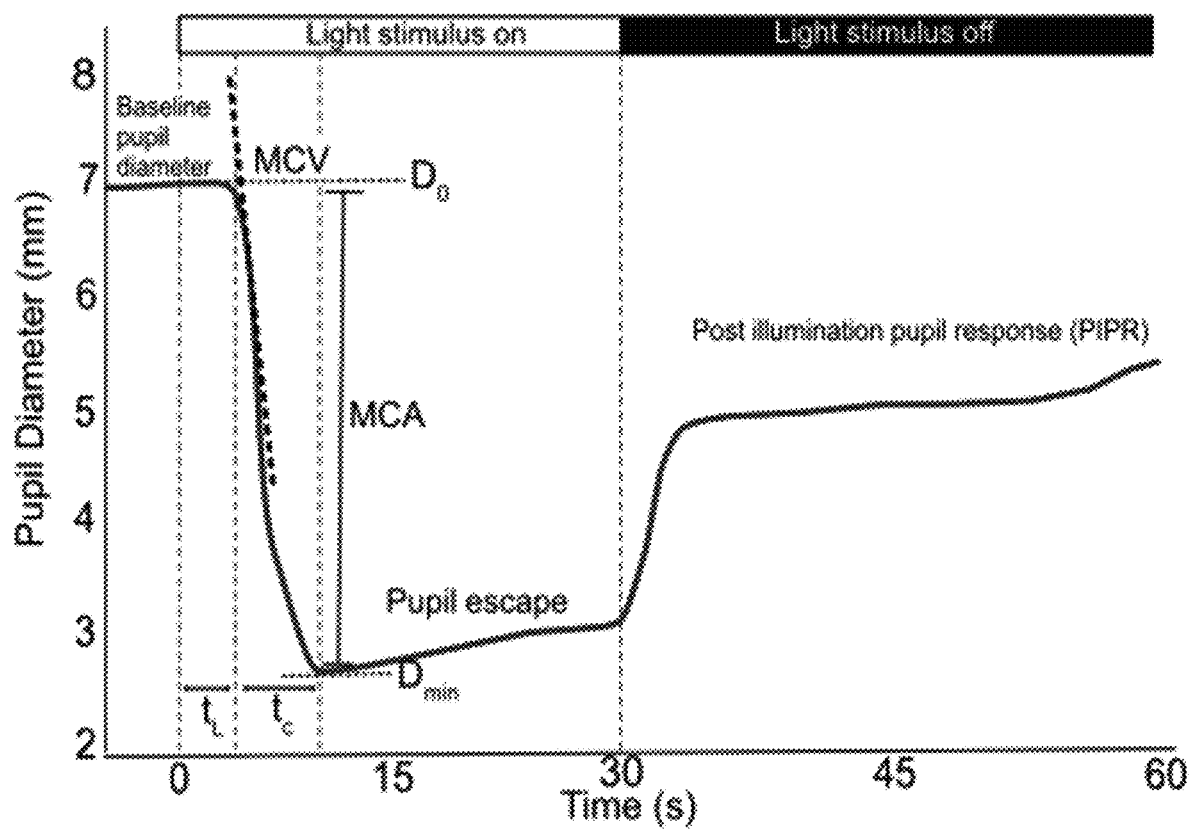
Figure 7:
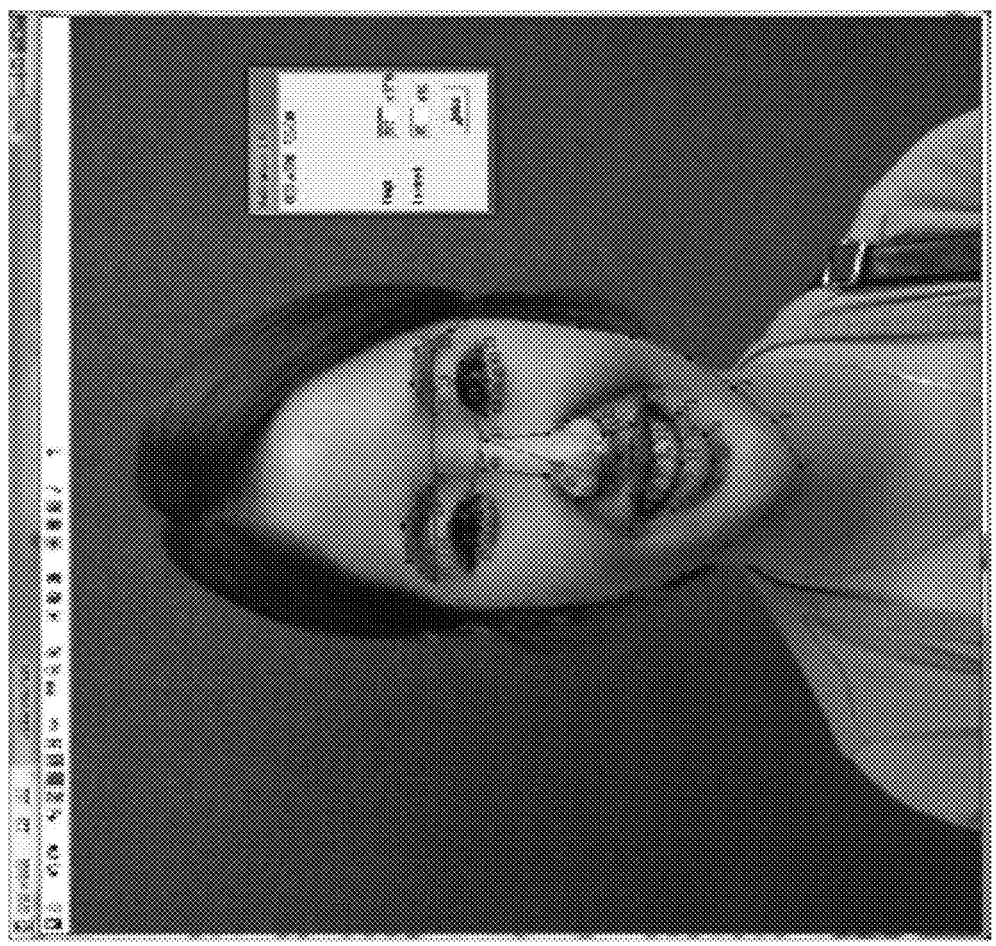
Figure 7:
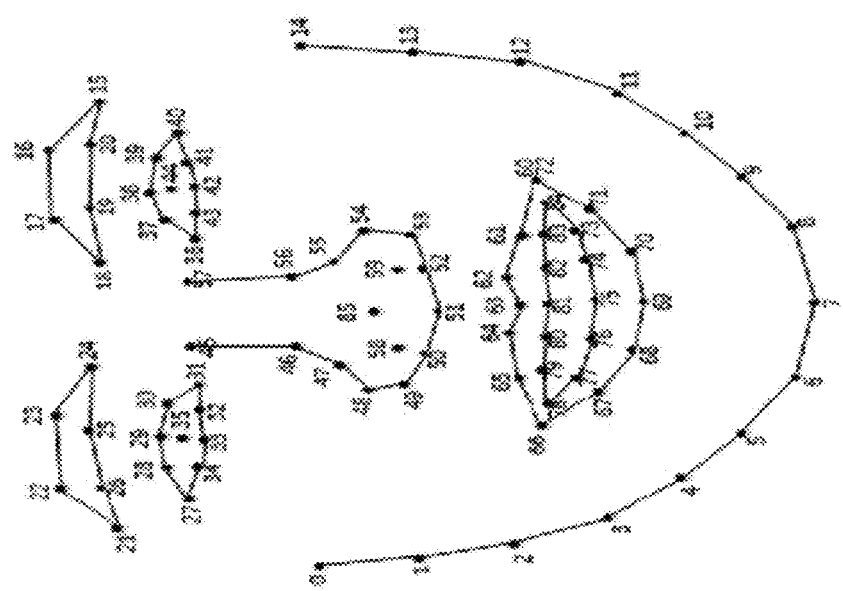

Having thus described the presently disclosed subject matter in general terms, reference will now be made to the accompanying Drawings, which are not necessarily drawn to scale, and wherein:

FIG. 1 is a diagram of an impairment analysis system in accordance with embodiments of the present disclosure;

FIG. 2 is a top perspective, front view of an attachment for a computing device for implementing impairment analysis in accordance with embodiments of the present disclosure;

FIG. 3 is a top perspective, rear view of the attachment shown in FIG. 2;

FIG. 4 is a flow diagram of an example method for impairment analysis in accordance with embodiments of the present disclosure;

FIG. 5 is a flow diagram of an example method for impairment analysis in accordance with embodiments of the present disclosure;

FIG. 6 is a graph that depicts intoxication gauged based on pupillary responses; and FIG. 7 is an image of landmarks on a rendered face for creating reference points.

SUMMARY

The presently disclosed subject matter relates to impairment analysis systems and related methods. According to an aspect, an impairment analysis system includes a light source configured for directing light towards a subject. For example, the light source can be a series of light emitting diodes (LEDs). The light can be directed to the subject's field of vision. Further, the system includes a distance sensor configured for determining the location of the subject from the light source. The system also includes an image capture device configured for capturing one or more images of the subject. Further, the system includes a computing device configured to control the light source to emit light in a predetermined pattern to apply light stimulus to the subject. The light source can be controlled so that it generates light from individual LEDs in a predetermined pattern which the subject is directed to follow with his or her eyes. The computing device is also configured to receive, from the distance sensor, information regarding the determined location of the subject. The computing device can determine the distance of the light source from the subject and a precise location of the illuminated LED at each point in the predetermined pattern. Further, the computing device is configured to receive, from the image capture device, the captured one or more images of the subject including one of a facial movement and position of the subject while the light stimulus is applied to the subject in a predetermined location with respect to the distance sensor. The computing device is also configured to use the facial movement and position of the subject for analyzing impairment of the subject. Further, the computing device is configured to present, to a user, a result of the impairment analysis.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, "an element" means at least one element and can include more than one element.

"About" is used to provide flexibility to a numerical endpoint by providing that a given value may be "slightly above" or "slightly below" the endpoint without affecting the desired result.

The use herein of the terms "including," "comprising," or "having," and variations thereof is meant to encompass the elements listed thereafter and equivalents thereof as well as additional elements. Embodiments recited as "including," "comprising," or "having" certain elements are also contemplated as "consisting essentially of" and "consisting" of those certain elements.

Recitation of ranges of values herein are merely intended to serve as a shorthand method of referring individually to each separate value falling within the range, unless otherwise indicated herein, and each separate value is incorporated into the specification as if it were individually recited herein. For example, if a range is stated as between 1%-50%, it is intended that values such as between 2%-40%, 10%-30%, or 1%-3%, etc. are expressly enumerated in this specification. These are only examples of what is specifically intended, and all possible combinations of numerical values between and including the lowest value and the highest value enumerated are to be considered to be expressly stated in this disclosure.

Unless otherwise defined, all technical terms used herein have the same meaning as commonly understood by one of ordinary skill in the art to which this disclosure belongs.

The functional units described in this specification have been labeled as computing devices. A computing device may be implemented in programmable hardware devices such as processors, digital signal processors, central processing units, field programmable gate arrays, programmable array logic, programmable logic devices, cloud processing systems, or the like. The computing devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together but may comprise disparate instructions stored in different locations which, when joined logically together, comprise the computing device and achieve the stated purpose of the computing device. In another example, a computing device may be a server or other computer located within a retail environment and communicatively connected to other computing devices (e.g., POS equipment or computers) for managing accounting, purchase transactions, and other processes within the retail environment. In another example, a computing device may be a mobile computing device such as, for example, but not limited to, a smart phone, a cell phone, a pager, a personal digital assistant (PDA), a mobile computer with a smart phone client, or the like. In another example, a computing device may be any type of wearable computer, such as a computer with a head-mounted display (HMD), or a smart watch or some other wearable smart device. Some of the computer sensing may be part of the fabric of the clothes the user is wearing. A computing device can also include any type of conventional computer, for example, a laptop computer or a tablet computer. A typical mobile computing device is a wireless data access-enabled device (e.g., an iPHONE® smart phone, a BLACKBERRY® smart phone, a NEXUS ONE™ smart phone, an iPAD® device, smart watch, or the like) that is capable of sending and receiving data in a wireless manner using protocols like the Internet Protocol, or IP, and the wireless application protocol, or WAP. This allows users to access information via wireless devices, such as smart watches, smart phones, mobile phones, pagers, two-way radios, communicators, and the like. Wireless data access is supported by many wireless networks, including, but not limited to, Bluetooth, Near Field Communication, CDPD, CDMA, GSM, PDC, PHS, TDMA, FLEX, ReFLEX, iDEN, TETRA, DECT, DataTAC, Mobitex, EDGE and other 2G, 3G, 4G, 5G, and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone or smart watch that operates over GPRS (General Packet Radio Services), which is a data technology for GSM networks or operates over Near Field Communication e.g. Bluetooth. In addition to a conventional voice communication, a given mobile device can communicate with another such device via many different types of message transfer techniques, including Bluetooth, Near Field Communication, SMS (short message service), enhanced SMS (EMS), multi-media message (MMS), email WAP, paging, or other known or later-developed wireless data formats. Although many of the examples provided herein are implemented on smart phones, the examples may similarly be implemented on any suitable computing device, such as a computer.

An executable code of a computing device may be a single instruction, or many instructions, and may even be distributed over several different code segments, among different applications, and across several memory devices. Similarly, operational data may be identified and illustrated herein within the computing device, and may be embodied in any suitable form and organized within any suitable type of data structure. The operational data may be collected as a single data set, or may be distributed over different locations including over different storage devices, and may exist, at least partially, as electronic signals on a system or network.

The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

As used herein, the term "memory" is generally a storage device of a computing device. Examples include, but are not limited to, read-only memory (ROM) and random access memory (RAM).

The device or system for performing one or more operations on a memory of a computing device may be a software, hardware, firmware, or combination of these. The device or the system is further intended to include or otherwise cover all software or computer programs capable of performing the various heretofore-disclosed determinations, calculations, or the like for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl, or other suitable programming languages.

As referred to herein, the terms "computing device" and "entities" should be broadly construed and should be understood to be interchangeable. They may include any type of computing device, for example, a server, a desktop computer, a laptop computer, a smart phone, a cell phone, a pager, a personal digital assistant (PDA, e.g., with GPRS NIC), a mobile computer with a smartphone client, or the like.

As referred to herein, a user interface is generally a system by which users interact with a computing device. A user interface can include an input for allowing users to manipulate a computing device, and can include an output for allowing the system to present information and/or data, indicate the effects of the user's manipulation, etc. An example of a user interface on a computing device (e.g., a mobile device) includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. A user interface can include an input for allowing users to manipulate a computing device, and can include an output for allowing the computing device to present information and/or data, indicate the effects of the user's manipulation, etc. An example of a user interface on a computing device includes a graphical user interface (GUI) that allows users to interact with programs or applications in more ways than typing. A GUI typically can offer display objects, and visual indicators, as opposed to text-based interfaces, typed command labels or text navigation to represent information and actions available to a user. For example, a user interface can be a display window or display object, which is selectable by a user of a computing device for interaction. The display object can be displayed on a display screen of a computing device and can be selected by and interacted with by a user using the user interface. In an example, the display of the computing device can be a touch screen, which can display the display icon. The user can depress the area of the display screen where the display icon is displayed for selecting the display icon. In another example, the user can use any other suitable user interface of a computing device, such as a keypad, to select the display icon or display object. For example, the user can use a track ball or arrow keys for moving a cursor to highlight and select the display object.

The display object can be displayed on a display screen of a mobile device and can be selected by and interacted with by a user using the interface. In an example, the display of the mobile device can be a touch screen, which can display the display icon. The user can depress the area of the display screen at which the display icon is displayed for selecting the display icon. In another example, the user can use any other suitable interface of a mobile device, such as a keypad, to select the display icon or display object. For example, the user can use a track ball or times program instructions thereon for causing a processor to carry out aspects of the present disclosure.

As referred to herein, a computer network may be any group of computing systems, devices, or equipment that are linked together. Examples include, but are not limited to, local area networks (LANs) and wide area networks (WANs). A network may be categorized based on its design model, topology, or architecture. In an example, a network may be characterized as having a hierarchical internetworking model, which divides the network into three layers: access layer, distribution layer, and core layer. The access layer focuses on connecting client nodes, such as workstations to the network. The distribution layer manages routing, filtering, and quality-of-server (QoS) policies. The core layer can provide high-speed, highly-redundant forwarding services to move packets between distribution layer devices in different regions of the network. The core layer typically includes multiple routers and switches.

FIG. 1 illustrates a diagram of an impairment analysis system 100 in accordance with embodiments of the present disclosure. Referring to FIG. 1, the system 100 includes a computing device 102, a light source 104, an image capture device 106, a distance sensor 108, and a display 110. As an example, the light source may be a light emitter or referred to as a "light emitter". The computing device 102 may be, for example, a smartphone, a tablet computer, or the like. Each of the light source 104, image capture device 106, distance sensor 108, and display 110 may be communicatively connected to the computing device 102 by wired or wireless connection. Further, each of the light source 104, image capture device 106, distance sensor 108, and display 110 may be mechanically connected to the computing device 102 to facilitate carry by a user or operator. In an example, one or more of the light source 104, image capture device 106, distance sensor 108, and display 110 may be integrated into the computing device 102.

In accordance with embodiments, the light source 104 may be configured to direct light towards a subject, such as subject 112, undergoing impairment analysis. The light may be displayed in a predetermined pattern that serves as a stimulus for the subject 112 undergoing impairment analysis and who is directed to follow with his or her eyes. The distance sensor 108 may be configured to determine the location of the subject 112. The image capture device 106 may be a video camera or still camera configured to capture one or more images (including video) of the subject 112. The light source 104, image capture device 106, and distance sensor 108 may each be operatively controlled by the computing device 102 for implementing the functions disclosed herein.

The computing device 102 may include an impairment analyzer 114 for implementing functionality described herein. The impairment analyzer 114 may be configured to control the light source 104 to emit light in a predetermined pattern to present a light stimulus to the subject 112. Light directed to the subject 112 by the light source 104 is indicated by arrow 116.

The impairment analyzer 114 may receive, from the distance sensor 108, information regarding the determined location of the subject 112. For example, the distance sensor 108 may be an ultrasonic sensor that can measure the distance to the subject 112 by emitting a sound wave (generally indicated by arrow 118) at a particular frequency and listening for the return of that sound wave 118 in order to time the trip of the sound wave 118 to the subject 112 and back for determining the distance or an approximation of the distance. The information received at the computing device 102 from the distance sensor 108 may be data or information about the distance or distance approximation.

Further, the impairment analyzer 114 may receive, from the image capture device 106, the captured image(s) of the subject 112. The captured image(s) may include one of a facial movement and position of the subject while the subject 112 is following the light stimulus is applied to the subject 112 in a predetermined location with respect to the distance sensor 108. For example, the captured image(s) processed by the impairment analyzer 114 may only be the image(s) captured while the subject 112 is within the predetermined location, i.e., a location suitable for impairment analysis in accordance with embodiments of the present disclosure.

The impairment analyzer 114 may, as described in more detail herein, use the facial movement and/or position of the subject 112 for analyzing impairment of the subject 112. Further, the impairment analyzer 114 may present, to a user of the system 100, a result of the impairment analysis. For example, computing device 128 may include a user interface 120 including a display for presenting the result. In another example, the display 110 may be used by the computing device to display the result.

The impairment analyzer 110 may be implemented by any suitable hardware, software, firmware, and/or the like. For example, the impairment analyzer 110 may include memory 122 and one or more processors 124 for implementing the functionality disclosed herein. The computing device 102 may include one or more input/output (I/O) modules 126 for operatively connecting the computing device 102 to one or more of the light sources 104, image capture device 106, distance sensor 108, and the display 110.

FIG. 2 illustrates a top perspective, front view of an attachment 200 for a computing device (not shown) for implementing impairment analysis in accordance with embodiments of the present disclosure. Referring to FIG. 2, the attachment 200 may include multiple light sources 104A and 104B, an image capture device 106, and a distance sensor 108 that may have the same or similar functionality to the corresponding components shown in FIG. 1. In the example of FIG. 2, light source 104A is a strip of LEDs or LED system that extends between two ends 202 and 204 of a support structure 206. The LED system includes multiple LEDs that are separate from each other and that extend substantially along a straight line along the support structure 206. In this example, the LEDs are evenly spaced apart from its neighboring LED; however, the LEDs may be arranged in any suitable manner.

The support structure 206 may include a first portion 208A and a second portion 208B that are attached to each other and movable with respect to each other. In this example, portions 208A and 208B are pivotally connected and movable with respect to each other at a pivot area 210. LEDs 206A are attached to portion 208A, and LEDs 206B are attached to portion 208B. The portions 208A and 208B are moveable with respect to each other so that the attachment 200 can be compacted for transportation while not in use. The impairment analyzer can control the LEDs 206A and 206B to emit light in accordance with a predetermined pattern for presenting a light pattern stimulus to a subject. For example, the LED strip may perform the function of a stimulus during an HGN test (e.g., moving left and right and holding the subject's gaze). Further, the light from the LED strip can illuminate one or more of the subject's eyes, which can free up an operator's other hand for other tasks. Using an LED strip may have the example advantage of allowing for precise and repeatable stimulus movement, further standardizing tests between subjects.

The distance sensor 108 may be an ultrasonic distance sensor configured to detect distance to the subject in real time and verify that the subject is in the correct location while the test is administered. Using an ultrasonic sensor (in combination with a video camera), the subject may be detected without the need for any device contact, and is not affected by the object's color or optical characteristics such as reflectivity, transparency or opacity. This sensor can operate regardless of illumination conditions.

The image capture device 106 may be an infrared-type camera configured to capture and record the subject's eye movement during an HGN exam. The camera and/or computing device may keep a timestamped record for future reference of the exam. The camera is a non-contact device that detects electromagnetic energy (visible wavelengths and/or heat) and converts it into an electronic signal, which is then processed by the computing device to produce an image on a display (e.g., video monitor shown in FIG. 3). The device can record images during the day with visible light, or at night possibly with an additional light source. The high frame rate and IR can be advantageous for the application of machine learning.

The attachment 200 may include a base 212 that can mechanically attach to a computing device such that the attachment 200 is supported by the computing device or vice versa. In this way, the computing device and attachment 200 may be held by one hand of an operator such that the operator's other hand is free.

FIG. 3 is a top perspective, rear view of the attachment 200 shown in FIG. 2. Referring to FIG. 3, the attachment 200 includes a video monitor 300 for the display of thermal images captured by the camera. In an example, the display 300 may be an LCD display that can be interacted with by the user in real time. The display 300 can display a menu and finite state machine stepping through the HGN processes for interaction by the user.

The attachment 200 may include a housing 302 that contains a micro-controller. The micro-controller may use a program to administer the examination by performing a series of LED sequences while recording eye movement. The microcontroller may operate with a button and display interface. A single board computer can process the video information, and may store in memory the recordings with a timestamp and name of the test sequence. The impairment analyzer disclosed herein may be implemented by the microcontroller and its memory. Further, the housing 302 may contain other electronics such as a rechargeable battery for powering its electronics.

FIG. 4 illustrates a flow diagram of an example method for impairment analysis in accordance with embodiments of the present disclosure. The method may be implemented by the impairment analyzer disclosed herein. Referring to FIG. 4, the method includes a face detection step. Subsequently, the method includes face/pose localization. Key points are identified and localized on the face. These key points are used to obtain a normalized frame of reference for tracking relative iris movement. As a preprocessing step, the key points are passed through Bayesian stabilization filters for robust normalization. Further, the method includes iris instance segmentation for eye tracking. For intoxication analysis, an assessment can be provided in several ways. One such method is using a machine learning algorithm trained on previous eye movement data as a function of time. Another method is to do a spectral analysis and determine BAC with a precalculated thresholding of frequency components.

Iris instance segmentation may be implemented by computer vision made possible by deep learning algorithms. This processing method is extremely robust to various lighting conditions and can be performed on both a single or multichannel image. The iris instance segmentation may be offloaded to a separate processor that is optimized to run edge inference of deep learning models (e.g. the NVIDIA Jetson nano). It may also be uploaded to a remote server to perform faster and more robust processing.

FIG. 5 illustrates a flow diagram of an example method for impairment analysis in accordance with embodiments of the present disclosure. The method may be implemented by the impairment analyzer disclosed herein. Referring to FIG. 5, the method includes a step of custom pupil lighting setup that modules or operates a light to test pupillary response times. Further, the method includes deep learning based on iris instance segmentation for pupil size tracking. The method also includes a step of gauging intoxication based on pupillary responses.

In an example of HGN detection for impairment analysis, a video of the person is captured using the camera on the prototype device. The video is captured using a camera with infrared lighting illuminating the face at 20-180 Hz and each frame is sequentially analyzed. This video feed is the beginning of the processing pipeline. The next three steps are applied to each frame with the final steps occurring using the aggregated data extracted from the frames. The processor may be an edge computing device, e.g. an ARM CPU found on the raspberry pi 3, but may also be a Jetson nano which has the same range of functionality including deep learning support. An open source facial detection algorithm is used to detect the face in the picture. This can be from any number of libraries but OpenCV or dlib may be used. Once a face is detected, facial landmarks (e.g. corner of mouth, noise tip, jaw line, etc.) are computed, which correspond to a number of points in different positions on the subject's face. From here a facial pose/position are calculated and used as a reference point. This can be a weighted average of all the points. This reference point is necessary because there is a gaussian noise introduced by the movement of the camera/subject from frame to frame, and because of the measurement noise of the algorithms themselves. The iris is segmented. Each eye is cropped using common ratio from a human face and the segmentation masks are created. From these segmentation masks the iris centers are calculated and stored normalized to the reference point. The segmentation can be performed a number of ways. From there a shape fitting algorithm may be used to increase the accuracy of the detected instances. To classify clues, the eye movement data is stored as time series data and signal processing techniques, including windowing and distance measuring may be applied to measure eye movement frequencies that allow us to classify the stability/smoothness of eye movement, which is the mathematical interpretation of "stuttering" eye movement seen in intoxicated subjects during the horizontal gaze nystagmus test.

FIG. 6 is a graph that depicts intoxication gauged based on pupillary responses.

In accordance with embodiments, the system may use a modulation of a light source and tracking of iris/pupil sizes as described herein. This pipeline may be simpler from an algorithmic point. Because the entire image is being segmented on iris/pupil versus not iris/pupil, a facial reference point is not used to determine localization of the pupils. Only area is being measured in this example. The segmentation may be performed on the same video from the camera and subsequently the pupil size is plotted similar to the graph shown in FIG. 6. As the baseline is determined at the beginning of a test, several of these factors can be thresholded within the pupillary response to determine whether there is cannabis intoxication present.

In accordance with embodiments, a handheld, battery powered device is provided for impairment analysis. For example, the device may include the components of the system 100 shown in FIG. 1. The device may have multiple CPUs and a GPU which runs an operating system that records video, manages stimulus, and runs/evaluates signal processing algorithms. The device may be operable to communicatively connect to a WI-FI® network or any other communications network. The device may include a rechargeable battery. It is non-invasive, meaning it never has to make contact with a subject, such as subject 112 shown in FIG. 1.

The device may have a screen that can show distance measurements and can display what part of the nystagmus processing it is performing. The screen can guide the user in performing the test.

The device may have one or more distance sensors. The distance sensor(s) may operate by using ultrasound pulses that reflect off an object and it listens for the return and times it to detect what is directly in front of the sensor. The distance sensor can be important because the official roadside nystagmus test requires the device to be held at a distance of 12-15 inches. Multiple sensors may be used to achieve the accuracy and precision needed to properly assess whether a subject is exhibiting nystagmus. The distance sensor is used in the backend processing to normalize the pupil size so small perturbations in movement between the device and subject boost accuracy in backend processing.

The device may include a light with illumination intensity controlled by the onboard CPU. This light can emit infrared+visible light, or just infrared lighting. The light may be used so the device can function in at any time of day/night and so it can help normalize the lighting in the images for backend processing The device may include a light sensor to assess the lighting conditions and inform the processing chain when determining nystagmus/BAC/THC blood concentration. Further, the device may have a stimulus in the form of a fold out LED strip that guides the eyes by turning on and off the LEDs in a sequential manner in a pattern controlled by the CPU. This LED strip guides the eyes to perform the 4 steps of the nystagmus test. The mechanical device is designed to operate multiple sensors for the collection of data to be fed to the signal processing backend. These multiple data sources are analyzed in parallel with machine learning techniques to increase the accuracy of the intoxication measurements.

In accordance with embodiments, techniques for impairment analysis disclosed herein can involve deep learning. Using a movie as an analogy, the algorithm can segment and track the actor in front of any background. Deep learning algorithms are much more sophisticated and are "trained". These algorithms can learn context about the pictures, e.g. when certain groupings of pixels are together, that usually means they represent a dog, or in a different grouping, a cat. These algorithms that have contextual awareness learned from these millions of datapoints, and can be tuned to work on eye images.

In an example case, a frame (a picture) is taken in by the camera at a framerate determined by the algorithms at variable resolution (720-1440p). The frame contains the subject face in Red Green Blue ("RGB") values. Each frame is processed by the deep learning backend algorithms to find the face. A second deep learning algorithm is used to identify the same 68 landmarks that every face contains. FIG. 7 illustrates images including an image of a person's and landmarks for creating a reference points. These landmarks are used to create a reference point between all frames capture for stabilizing the face. They are also used to crop out the eyes so that high resolution processing is performed only on the area around the eyes, which allows real time processing. Each eye is shown to a third deep learning algorithm which classifies every pixel in the image as either belonging to a pupil, iris, or "background" (background here means non pupil/iris) This is called image segmentation and the algorithm is trained on millions of images as described in the note above and customized for eyes. When the iris pixels are segmented, the algorithm uses an ellipse estimation algorithm that tunes the edges of the deep learning algorithm to nicely fit onto the iris. The center of that ellipse is then calculated and stored. The center of the ellipse represents the pupil location and using the reference landmarks, the absolute position of the eye can be determined and tracked over time. The processing chain can run the standard four nystagmus tests that are present in a roadside test, tracks the absolute 2D coordinates of the pupils, and compares them to what the algorithm calculates should be the baseline eye movement of a non-intoxicated individual. The baseline eye movement is calculated using geometry. The movement pattern of the lit up LEDs on the device can be controlled along with the distance from the persons face. Subsequently, the process can work backwards to where their eyes should be looking and the rate of change for their iris positioning.

In a comparison, the positions of the iris over time are compared to the ideal positions of the irises over time and an algorithm which calculates the distance between the two points determines the intensity of nystagmus present in the subject under test. This level of nystagmus allows us to gauge the BAC because the larger "distances" in this comparison indicate a more drastic intoxication level. An additional feature in is determining the precise Blood Alcohol Content based on the angle of onset of nystagmus. This can be implemented by the operator pausing the light source at the moment when onset is detected. Data from the precise location of the emitter at the time angle of onset is detected and the exact distance from the subject is used to calculate the angle of onset using triangulation. The algorithm may assess all the data within the four tests and returns a "clue" for each test, indicating whether or not nystagmus is present, and finally it can return an estimation of the subjects Blood Alcohol concentration. The video of the process can be saved and labeled. In addition, data showing the location of the light stimulus on the emitter at each point in time and the angle of onset are also saved. All of this can be retrieved from the device for presentation in court or various other uses.

For cannabis/blood THC content sensing, the physical device housing may be the same. The CPU can measure the lighting in the environment to set the baseline. The device has a focused light source that illuminates the subjects face with a lumen determined by the device to achieve a measurable pupillary response. The light is controlled by the processor and is turned on and off for precise series of times. The device captures frames of the subjects face during initial calibration, the illumination of the face, and post illumination as the pupils reset to their initial size. The backend algorithm is measuring the pupil sizes using the backend processing described during the nystagmus process. The determination of blood THC concentration is calculated based off of several metrics in the expected pupillary response, normalized from the lighting and initial pupil size. The blood THC concentration estimation is then presented to the user via the screen and the videos are also saved. The same pupillary response curves can be used to correlate BAC levels as pupillary response is a bioindicator of intoxication. The metrics for THC, BAC, and several other pharmacological intoxicators can be determined from a pupillary response curve when illumination and the full response is recorded.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network, or Near Field Communication. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++, Javascript or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. An impairment analysis system comprising:
    a handheld image capture device that captures a plurality of images of an eye of a subject illuminated by ambient light over a period of time;
    a computing device comprising at least one processor and memory configured to:
        control a light source to emit light in a predetermined pattern for guiding the subject's eyes during capture of the plurality of images of the eye over the period of time;
        receive, from the image capture device, the captured plurality of images, wherein the images include pixels corresponding to a pupil, iris, background, or other features of the eye of the subject;
        maintain a database of machine learning analysis of other subject's normal eye movement in response to an applied light stimulus;
        classify pixels from the captured plurality of images as either pupil, iris, background, or other features of the eye of the subject based on the database of machine learning analysis;
        track movement of the classified pixels in the plurality of images over the period of time;
        analyze impairment of the subject based on the tracked movement as compared to the machine learning analysis in the database; and
        present, to a user, a result of the impairment analysis.

2. The impairment analysis system of claim 1, wherein the light source comprises a light emitting diode (LED) system that guides the subject's eyes.

3. The impairment analysis system of claim 2, wherein the LED system comprises a plurality of LEDs that are separate from each other and extend substantially along a straight line.

4. The impairment analysis system of claim 2, wherein the LED system comprises:
    a support structure comprising a first portion and a second portion that are attached to each other and movable with respect to each other; and
    a first set of LEDs and a second set of LEDs attached to each other and to the support structure.

5. The impairment analysis system of claim 2, wherein the LED system comprises a plurality of LEDs, and
    wherein the computing device is configured to control the LEDs to emit light in accordance with the predetermined pattern.

6. The impairment analysis system of claim 1, wherein the light source is configured to generate light for guiding the subject's eyes.

7. The impairment analysis system of claim 1, further comprising an ultrasonic sensor configured for determining a location of the subject,
    wherein the computing device configured to receive, from the ultrasonic sensor, information regarding the determined location of the subject, and
    wherein the computing device is configured to use the information regarding the determined location of the subject for verifying whether the subject is within a predetermined location for analyzing the impairment of the subject.

8. The impairment analysis system of claim 1, further comprising a display configured to display the result of the impairment analysis.

9. The impairment analysis system of claim 1, wherein the computing device is configured to present to the user a guide for administering the impairment analysis of the subject.

10. The impairment analysis system of claim 1, wherein the computing device is attachable to the light source, a distance sensor, and the image capture device.

11. The impairment analysis system of claim 1, wherein the computing device is configured to detect the subject's face based on the captured one or more images.

12. The impairment analysis system of claim 11, wherein the computing device is configured to implement face localization and/or pose localization based on the captured one or more images.

13. The impairment analysis system of claim 1, wherein the computing device is configured to:
track one or both of the subject's eyes and irises; and
analyze impairment of the subject based on the tracking of one or both of the subject's eyes and irises.

14. An impairment analysis method comprising:
using a handheld device for capturing a plurality of images of an eye of a subject;
controlling a light source to emit light in a predetermined pattern for guiding the subject's eyes during capture of the plurality of images of the illuminated eye over the period of time;
receiving, from the image capture device, the captured plurality of images, wherein the images include pixels corresponding to a pupil, iris, background, or other features of the eye of the subject;
maintaining a database of machine learning analysis of other subject's normal eye movement in response to an applied light stimulus;
classifying pixels from the captured plurality of images as either pupil, iris, background, or other features of the eye of the subject based on the database of machine learning analysis;
analyzing impairment of the subject based on the tracked movement as compared to the machine learning analysis in the database; and
presenting, to a user, a result of the impairment analysis.

15. The method of claim 14, wherein the light source comprises a light emitting diode (LED) system that directs light.

16. The method of claim 15, wherein the LED system comprises a plurality of LEDs that are separate from each other and extend substantially along a straight line.

17. The method of claim 15, wherein the LED system comprises:
a support structure comprising a first portion and a second portion that are attached to each other and movable with respect to each other; and
a first set of LEDs and a second set of LEDs attached to each other and to the support structure.

18. The method of claim 15, wherein the LED system comprises a plurality of LEDs, and
wherein the method comprises controlling the LEDs to emit light in accordance with the predetermined pattern.

19. The method of claim 14, wherein the system further comprises an ultrasonic sensor configured for determining a location of the subject;
wherein the method further comprises:
receiving, from the ultrasonic sensor, information regarding the determined location of the subject; and
using the information regarding the determined location of the subject for verifying whether the subject is within a predetermined location for analyzing the impairment of the subject.

20. The method of claim 14, comprising displaying the result of the impairment analysis.

21. The method of claim 14, comprising presenting to the user a guide for administering the impairment analysis of the subject.

22. The method of claim 14, comprising detecting the subject's face based on the captured one or more images.

23. The method of claim 22, comprising implementing face localization and/or pose localization based on the captured one or more images.

24. The method of claim 14, further comprising:
tracking one or more of the subject's eyes; and
analyzing impairment of the subject based on the tracking of the one or both of the subject's eyes and irises.

25. The method of claim 14, further comprising:
tracking one or more of the subject's eye irises; and
analyzing impairment of the subject based on the tracking of one or both of the subject's eyes and irises.

26. The impairment analysis system of claim 1, wherein the determined portion of the subject's eyes is an approximate center of an iris or a pupil of the subject.

27. The method of claim 14, wherein the determined portion of the subject's eyes is an approximate center of an iris or a pupil of the subject.

28. The impairment analysis system of claim 1, wherein the computing device is configured to:
determine an estimated center of a plurality of the classified pixels; and
track movement of the estimated center in the plurality of images over the period of time; and
analyze impairment of the subject based on the tracked movement of the estimated center.

29. The impairment analysis system of claim 1, wherein the computing device is configured to classify the pixels based on a database of images of eyes.

30. The impairment analysis system of claim 1, wherein the image capture device and the computing device are configured as a handheld device.

31. The impairment analysis system of claim 1, wherein the computing device is configured to:
detect a face of the subject;
determine one or more points on the face of the subject;
use the determined one or more points to obtain a normalized frame of reference of the face of the subject; and
track movement of the classified pixels in the plurality of images based on the normalized frame of reference of the face of the subject.

\* \* \* \* \*